US007209185B2

(12) United States Patent
Thompson et al.

(10) Patent No.: US 7,209,185 B2
(45) Date of Patent: Apr. 24, 2007

(54) UNIVERSAL MOUNTING TECHNIQUE FOR VIDEO MATRIX SWITCHING WITH CHASSIS VOLUME REDUCTION

(75) Inventors: Edwin S. Thompson, Campbell Hall, NY (US); William A. Crable, Jr., Blauvelt, NY (US); Christopher M. Mullins, Pearl River, NY (US); Leroy Davis, Clifton, NJ (US); Gregory Gelman, Ramsey, NJ (US); Robert E. Germain, Scarsdale, NY (US); Albert Harding, Hamburg, NJ (US); Harold Johnson, Monroe, NY (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 11/214,408

(22) Filed: Aug. 29, 2005

(65) Prior Publication Data

US 2006/0092279 A1 May 4, 2006

Related U.S. Application Data

(62) Division of application No. 09/614,288, filed on Jul. 12, 2000, now Pat. No. 6,943,849.

(51) Int. Cl.
*H04N 5/268* (2006.01)

(52) U.S. Cl. ...................................... 348/705; 348/706

(58) Field of Classification Search ................ 348/705, 348/706, 722, 143, 152, 153, 156, 159; 340/2.28, 340/14.4, 14.69; 439/488, 519, 521, 527, 439/532, 489, 481, 713, 718; *H04N 5/268*
See application file for complete search history.

(56) References Cited

U.S. PATENT DOCUMENTS

| | | | | |
|---|---|---|---|---|
| 4,037,250 | A * | 7/1977 | McGahan et al. | 348/159 |
| 4,276,562 | A * | 6/1981 | Stewart et al. | 725/151 |
| 4,480,890 | A * | 11/1984 | McGlew | 439/488 |
| 4,700,230 | A * | 10/1987 | Pshtissky et al. | 348/159 |
| 5,170,252 | A * | 12/1992 | Gear et al. | 348/659 |
| 5,862,342 | A * | 1/1999 | Winter et al. | 709/231 |
| 5,990,981 | A * | 11/1999 | Thompson et al. | 348/705 |

FOREIGN PATENT DOCUMENTS

| | | |
|---|---|---|
| DE | 3331616 | * 4/1985 |
| GB | 2 337 371 | * 11/1999 |
| WO | WO 98/33247 | * 7/1998 |

* cited by examiner

*Primary Examiner*—Sherrie Hsia
(74) *Attorney, Agent, or Firm*—The Small Patent Law Group LLP; Dean D. Small

(57) ABSTRACT

A video signal connection apparatus comprises an array of individual video signal connector contacts arranged in a matrix having connector contact rows and connector contact columns, the individual video signal connector contacts extending in a first connection ‘direction, a connector having individual connector contacts corresponding in number to the individual video signal connector contacts of the array, the individual connector contacts extending in a second connection direction, the second connection direction being orthogonal to the first connection direction and conductors interconnecting the individual video signal connector contacts to the individual connector contacts.

12 Claims, 8 Drawing Sheets

UNIVERSAL MOUNTING TECHNIQUE FOR VIDEO MATRIX SWITCHING WITH CHASSIS VOLUME REDUCTION

CROSS REFERENCE TO RELATED APPLICATIONS

This application is a divisional of U.S. patent application Ser. No. 09/614,288, filed Jul. 12, 2000, now U.S. Pat, No. 6,943,849 which is hereby incorporated by reference and is assigned to assignee of the present application.

FIELD OF THE INVENTION

This invention relates generally to electrical connection apparatus and pertains more particularly to connection apparatus for use in CCTV (closed circuit television) systems for surveillance applications.

BACKGROUND OF THE INVENTION

Known CCTV systems for surveillance applications typically include plural video cameras disposed at locations of interest and a connection apparatus having a so-called "back panel" with input connectors in number corresponding to the plurality of video cameras. Cables extending from the video cameras are terminated with a so-called "BNC" jack connector and the back panel input connectors are BNC socket connectors each receiving one of the cable jack connectors.

In one type of known CCTV systems for surveillance application, the BNC socket connectors are in turn individually connected by discrete wiring to input terminals of an electronic signal processing circuit (typically a printed circuit board (PCB)) which processes the camera video signals. Output terminals of the electronic processing circuit are connected by further discrete wiring to back panel output connectors.

The above-described type of known CCTV system presents great difficulties where the need for repair arises with respect to the electronic signal processing circuit thereof, i.e., the need for correction of a fault occurring therein. Thus, in order to remove the PCB for testing, all of the discrete wire connections (input and output) to the PCB need to be separated, and all of the wires and PCB connectors need to be suitably identified for subsequent reconnection.

In a second known type of CCTV system for article surveillance, the foregoing repair difficulties are overcome by providing a separable connection within the connection apparatus. In this type of connection apparatus, the electronic signal processing circuit is provided in the form of a plurality of PCBs each having a card edge male connection part. The discrete wiring from the back panel input and output connectors terminates at a plurality of card edge receiving connectors. Where repair of a PCB is required, the PCB is simply removed from its connector so that disconnection of discrete wiring between the back panel connectors and the card edge receiving connectors is not necessary.

While the second described type of connection apparatus thus has an advantage over the first described connection apparatus type, both types, and all other known CCTV connection apparatus, have a common failing, as will be described in the following discussion.

In all known CCTV system connection apparatus, the back panel includes a rectangular member having minimum x and y dimensions dictated by the number of input/output connectors. The rectangular member is supported at the rear of an open parallelepiped housing extending along the z-axis. The discrete wiring extends along the z-axis to the electronic signal processing circuit (or to the card edge connectors in the second above-discussed apparatus). The electronic signal processing circuit likewise extends along the z-axis.

From applicant's perspective, known CCTV connection apparatus, being dictated by the geometry above discussed, does not address the trend toward more and more participating cameras (more and more back plane connectors and xy area) and the ever diminishing size of electronic signal processing circuitry. Rather, the present undesired volume of connection apparatus (monitoring station real estate being presently excessive) is seen as only likely to further spiral.

SUMMARY OF THE INVENTION

The present invention has as its primary object the provision of CCTV surveillance system connection apparatus which overcomes the foregoing disadvantages of presently known apparatus.

In attaining such object, the invention provides, in a first aspect, a video signal connection apparatus comprising:

(a) an array of individual video signal connector contacts arranged in a matrix having connector contact rows and connector contact columns, the individual video signal connector contacts extending in a first connection direction;

(b) a connector having individual connector contacts corresponding in number to the individual video signal connector contacts of the array, the individual connector contacts extending in a second connection direction, the second connection direction being orthogonal to the first connection direction; and (c) conductors interconnecting the individual video signal connector contacts to the individual connector contacts.

In attaining such object, the invention provides, in a second aspect, a video signal connection apparatus comprising:

(a) an array of individual video signal connector contacts arranged in a matrix having connector contact rows and connector contact columns, the individual video signal connector contacts extending in a first connection direction;

(b) a first connector having individual connector contacts corresponding in number to the individual video signal connector contacts of the array, the individual connector contacts extending in a second connection direction, the second connection direction being orthogonal to the first connection direction;

(c) conductors interconnecting the individual video signal connector contacts to the individual connector contacts;

(d) a second connector having individual connector contacts electrically engaged with the individual connector contacts of the first connector and extending in the second connection direction; and (e) a signal processing unit connected to the individual connector contacts of the second connector and aligned with the individual connector contacts of the first and second connectors.

In attaining such object, the invention provides, in a third aspect, a video signal connection apparatus comprising:

(a) an array of individual video signal connector contacts arranged in an x-axis, y-axis matrix, the array individual video signal connector contacts extending in a z-axis direction;

(b) a connector having individual connector contacts corresponding in number to the individual video signal connector contacts of the array, the individual connector contacts extending in the direction of the y-axis; and (c) conductors interconnecting the individual video signal connector contacts of the array to the individual connector contacts.

In attaining such object, the invention provides, in a fourth aspect, a video signal connection apparatus comprising:

(a) an array of individual video signal connector contacts arranged in an x-axis, y-axis matrix, the array individual video signal connector contacts extending in a z-axis direction;

(b) a connector having individual connector contacts corresponding in number to the individual video signal connector contacts of the array;, the individual connector contacts extending in the direction of the x-axis; and (c) conductors interconnecting the individual video signal connector contacts of the array to the individual connector contacts.

In attaining such object, the invention provides, in a fifth aspect, a video signal connection apparatus comprising:

(a) an array of individual video signal connector contacts arranged in a matrix having connector contact rows and connector contact columns, the individual video signal connector contacts extending in a first connection direction;

(b) a first substrate supporting the individual video signal connector contacts, the first substrate extending in a second connection direction, the second connection direction being orthogonal to the first connection direction; and (c) a signal processing unit supported on a second substrate, a portion of the second substrate being juxtaposed with a portion of the first substrate along the second connection direction.

In a still further aspect, the invention provides improvement of a CCTV system comprising N video cameras, a back panel having N connectors for receiving video output signals of the N video cameras, and M multiplexers connected to the back panel N connectors, M being a submultiple of N, wherein the N multiplexers are supported on a common substrate and latching means is provided for mutually securing the substrate and the back panel, the latching means being user operable for releasing the securement of the substrate and the back panel.

The invention will be further understood from consideration of the following description of preferred embodiments thereof and from the drawings where like reference numerals identify like parts throughout.

DETAILED DESCRIPTION OF PREFERRED EMBODIMENTS

Figure 1:
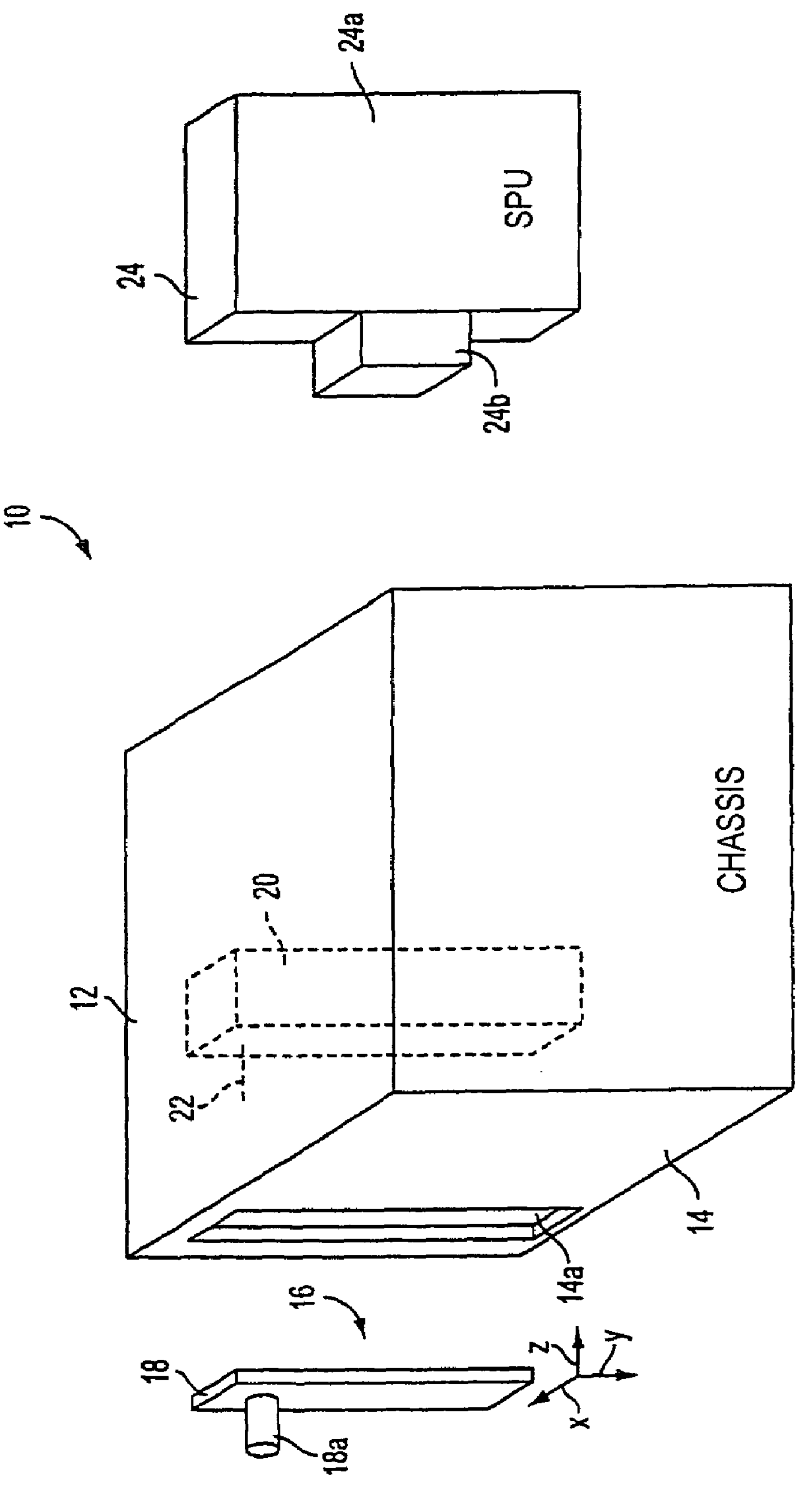
FIG. 1 (PRIOR ART)
FIG. 1 is an explanatory view generally depicting the above-discussed second known type of CCTV system for article surveillance.

FIG. 1, an explanatory view generally depicting the above-discussed second known type of CCTV system for article surveillance, shows in exploded fashion video signal connection apparatus 10. Apparatus 10 includes a generally boxed-shaped chassis 12, having back panel 14, which defines a plurality of slots, one being shown at 14*a,* for the receipt and retention of I/O connection contact units, one being shown at 16, comprising a substrate 18, from which a plurality of video signal connector contacts, i.e., I/O video signal connector contacts, one such contact being shown at 18*a,* in the form of a BNC male contact connectable with a female contact (not shown) of a video camera (not shown).

Interiorly of chassis 12 are supported connectors, one being shown at 20, for interconnection with the I/O connection contact units through conductors, conductor 22 being shown for connection of connection contact 18*a* to connector 20.

The I/O video signal connector contacts, e.g., contact 18*a,* extend along a connection direction coincident with the z-axis and the conductors, e.g., conductor 22, extend generally along such z-axis connection direction to connector 20. Signal processing units, one being shown at 24, are movable along the z-axis for insertion into and removal from connector 20. Signal processing unit 24 may typically be in the form of a PCB unit having circuit board 24*a* and card edge connector 24*b* connectably seatable in I/O connection contact unit 16.

The z-axis dimension, or depth, of chassis 12 will be seen to be dictated by the depth of back panel 14, the z-axis length of conductor 22, connector 20 and signal processing unit 24. The x- and y-axis dimensions of chassis 12 will be seen to be dictated by the number of I/O connection contact units 16. As also alluded to above, while the signal processing unit 24 is constantly diminishing in size with advantages in technology, only that portion of the z-axis dimension of chassis 12 is diminished thereby. Such volume dictation in video connection apparatus is overcome in the subject invention, as will be seen from the following discussion.

Figure 2:
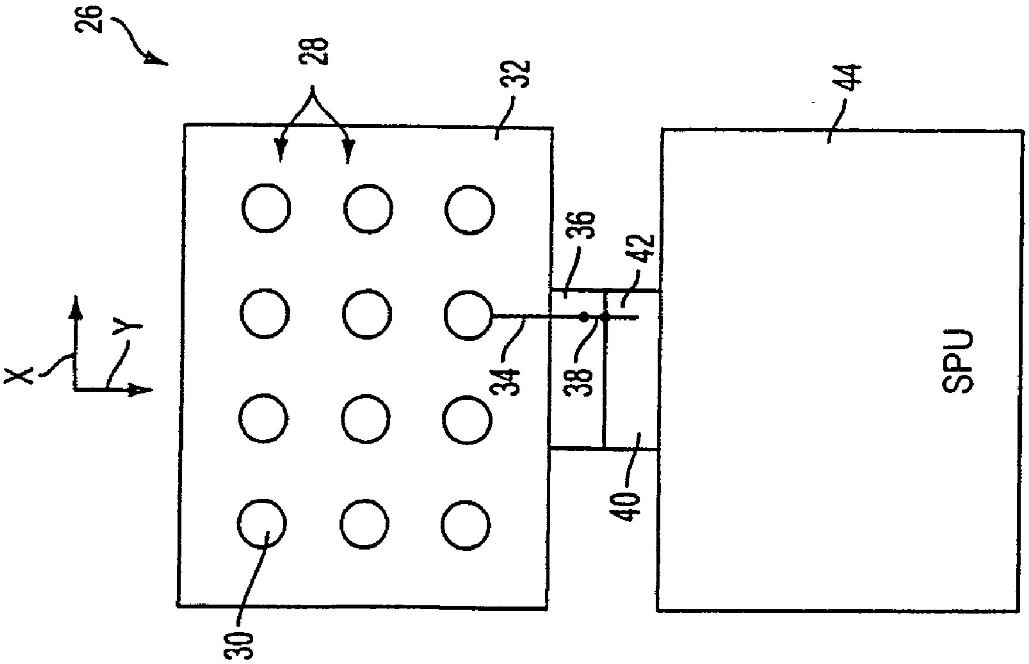
FIG. 2 is a front elevation of a first embodiment of video signal connection apparatus in accordance with the invention.

Referring to FIGS. 2 and, 3, video signal connection apparatus 26 includes an array 28 of individual video signal connector contacts 30, arranged in a matrix having connector contact rows and connector contact columns, the individual video signal connector contacts extending in a first connection direction, i.e., along the z-axis. Contacts 30 are supported in common by substrate 32. The full z-axis dimension of apparatus 26 is thus the sum of the z-axis dimensions of contacts 30 and substrate 32. Interiorly of substrate 32 are conductors 34 which extend in a second connection direction which is orthogonal to the first connection direction. Thus, conductors 34 run along the y-axis (vertically) to first connector 36.

First connector 36 has individual connector contacts 38 20 corresponding in number to the individual video signal connector contacts of the array. Connector contacts 38 also extend in the second connection direction.

Second connector 40 has individual connector contacts 42 electrically engaged with individual connector contacts 38 of first connector 36, extending in the second connection direction.

Signal processing unit 44 is connected to individual connector contacts 42 of second connector 40.

While array 28 of individual video signal connector contacts 30 is shown illustratively as a four-by-three matrix, the matrix may be of any desired size, e.g., the customary eight-by-six matrix allowing for the connection apparatus and user apparatus to communicate with forty-eight individual video cameras. As will be appreciated, such expansion of the connector contact array gives rise only to an increase in the xy area of the substrate-contact component of apparatus 26 and, where the substrate-contact component is wall-mounted, no incursion is made on real estate (counter top) where system monitoring equipment is disposed.

Returning again to FIGS. 2 and 3, first connector 36 and second connector 40 are separable from one another, second connector 40 being removable from video signal connection apparatus 26 with signal processing unit 44 upon separation of the first and the second connectors.

Figure 4:
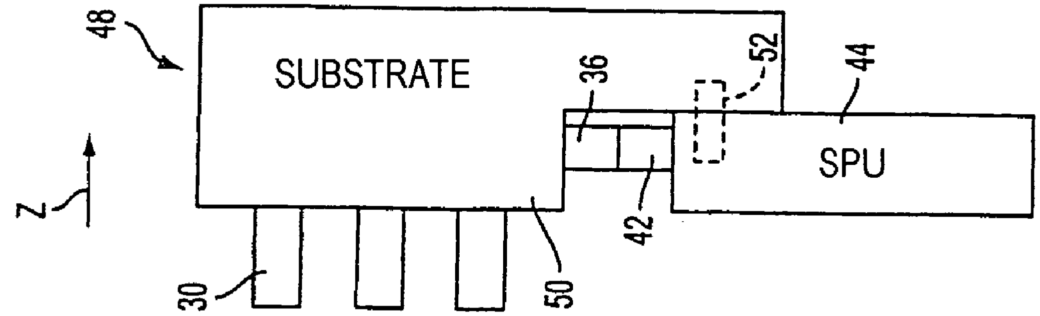
FIG. 4 is a side elevation of a second embodiment of video signal connection apparatus, in accordance with the invention.
Figure 3:
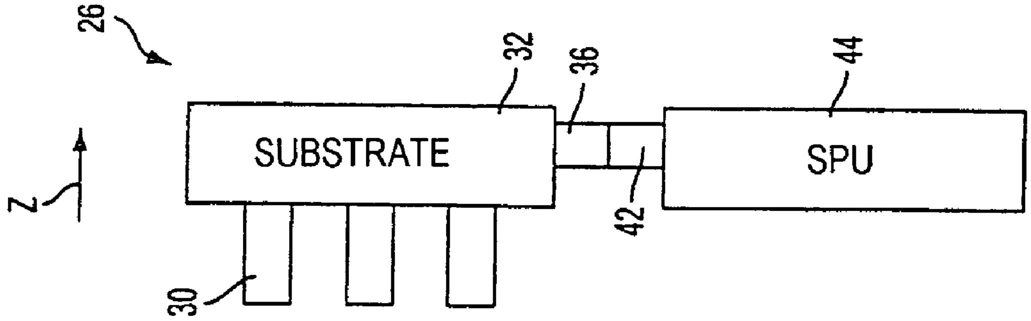
FIG. 3 is a side elevation of the FIG. 2 showing.

Turning to FIG. 4, video signal connection apparatus 48 is constituted by the same components as above discussed in connection with FIGS. 2 and 3 except for its substrate 50 and releasable connection device 52.

Substrate 50 has a longer dimension along the y-axis than does substrate 32, substrate 50 extending jointly in the second connection direction with at least a portion of signal processing unit 44, whereby the latter may be supported by the former through connection device 52, which may be comprised of releasable mechanical connectors at opposite lateral (x-axis) margins of connection apparatus 48 on each of substrate 50 and signal processing unit 44.

Figure 5:
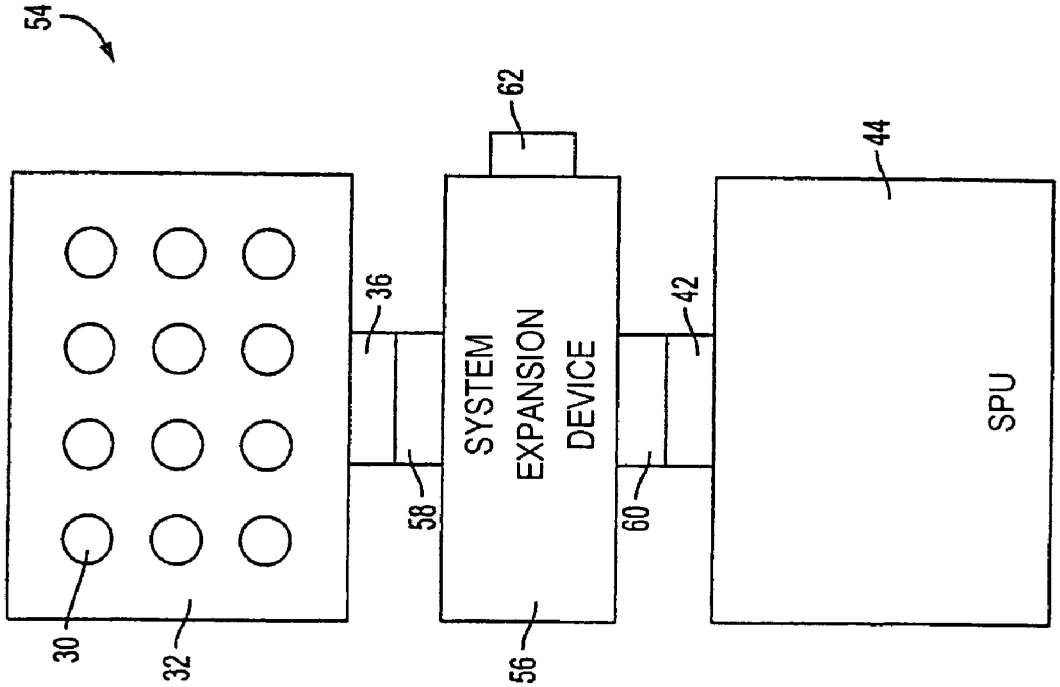
FIG. 5 is a front elevation of a third embodiment of video signal connection apparatus in accordance with the invention.

Turning to FIG. 5, connection apparatus 54 is configured in large part comparably with connection apparatus 26 of FIGS. 1 and 2 as indicated by the common reference numerals. However, a system expansion device 56 is provided and is connected to first connector 36 by third connector 58 and to second connector 42 through fourth connector 60. Individual contacts of connector 58 are connected to individual contacts of fifth connector 62, which makes all generated video camera output signals fed to contacts 30 available to user apparatus (not shown) of any desired type, e.g., memory means, recording means and networking means.

Figure 7:
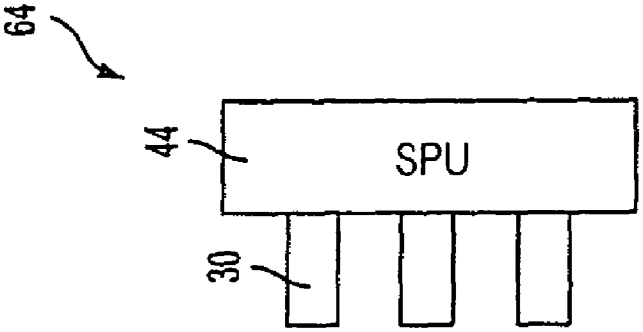
FIG. 7 is a side elevation of the FIG. 6 showing.
Figure 6:
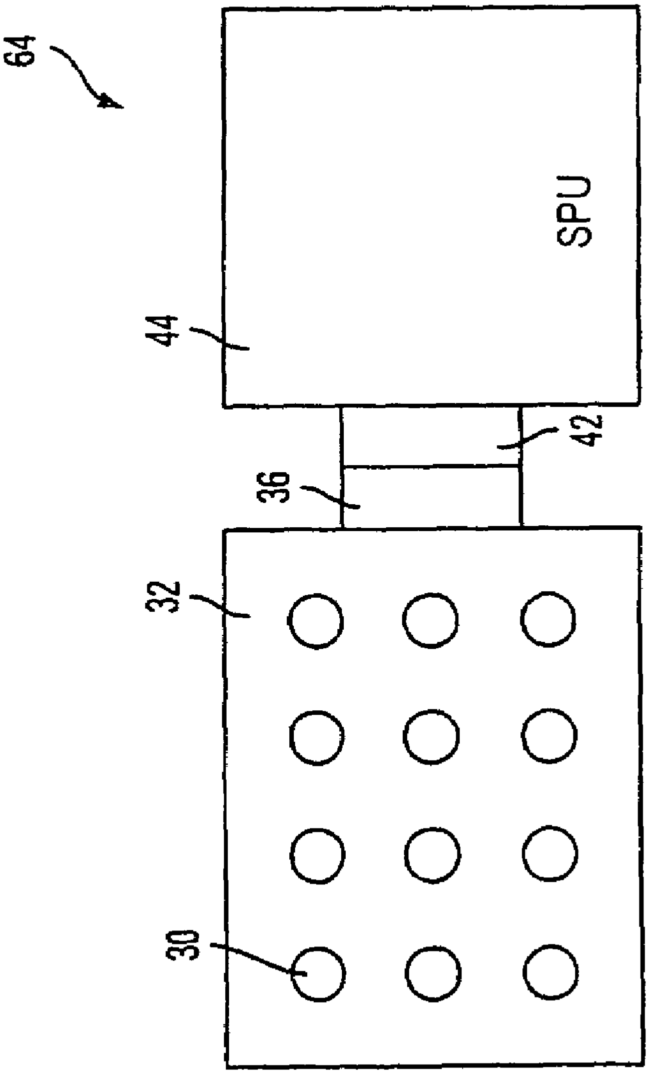
FIG. 6 is a front elevation of a fourth embodiment of video signal connection apparatus in accordance with the invention.

Turning to FIGS. 6 and 7, connection apparatus 64 is configured with the same components as connection apparatus 26 of FIGS. 1 and 2, however, with the contacts of connectors 36 and 42 and conductors connecting contacts 30 to contacts of connector 36 extending in a y-axis connection direction.

Figure 8:
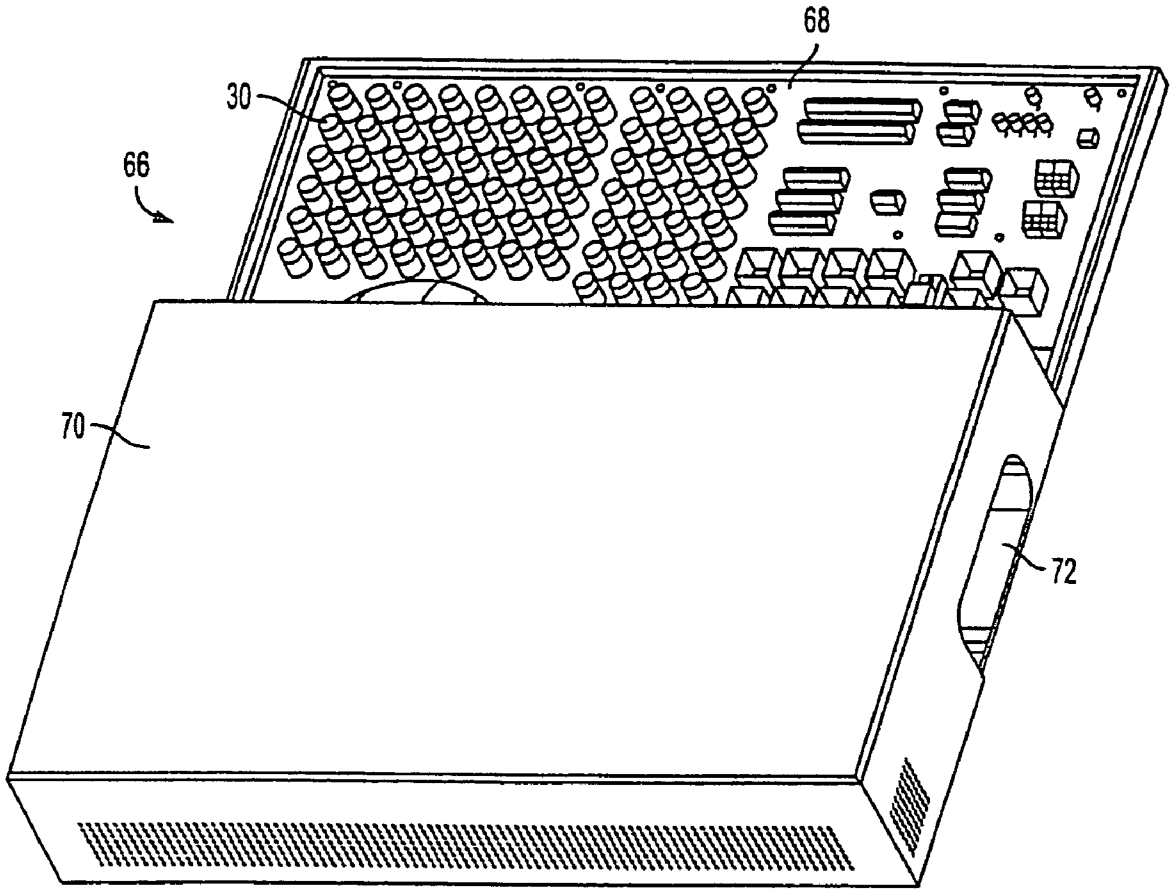
FIG. 8 is a perspective view of a fifth, particularly preferred, embodiment of video signal connection apparatus in accordance with the invention.

Connection apparatus 66 of FIG. 8 embodies a back panel substrate 68 having the array of contacts 30 and various other contacts and connectors usable in CCTV surveillance systems. Cover 70 encloses the connection apparatus signal processing circuitry and is slidably mounted on substrate 68 for downward and upward movement. At the limit of upward movement of cover 70, the cover and enclosed signal processing circuitry are latched into an operating position by a latch mechanism. To remove the cover and enclosed signal processing circuitry from the substrate, a user operates a release (unlatching) button (discussed below) located in recessed access slot 72, jointly with a like release button (not shown) at the left margin of cover 70.

Figure 9A:
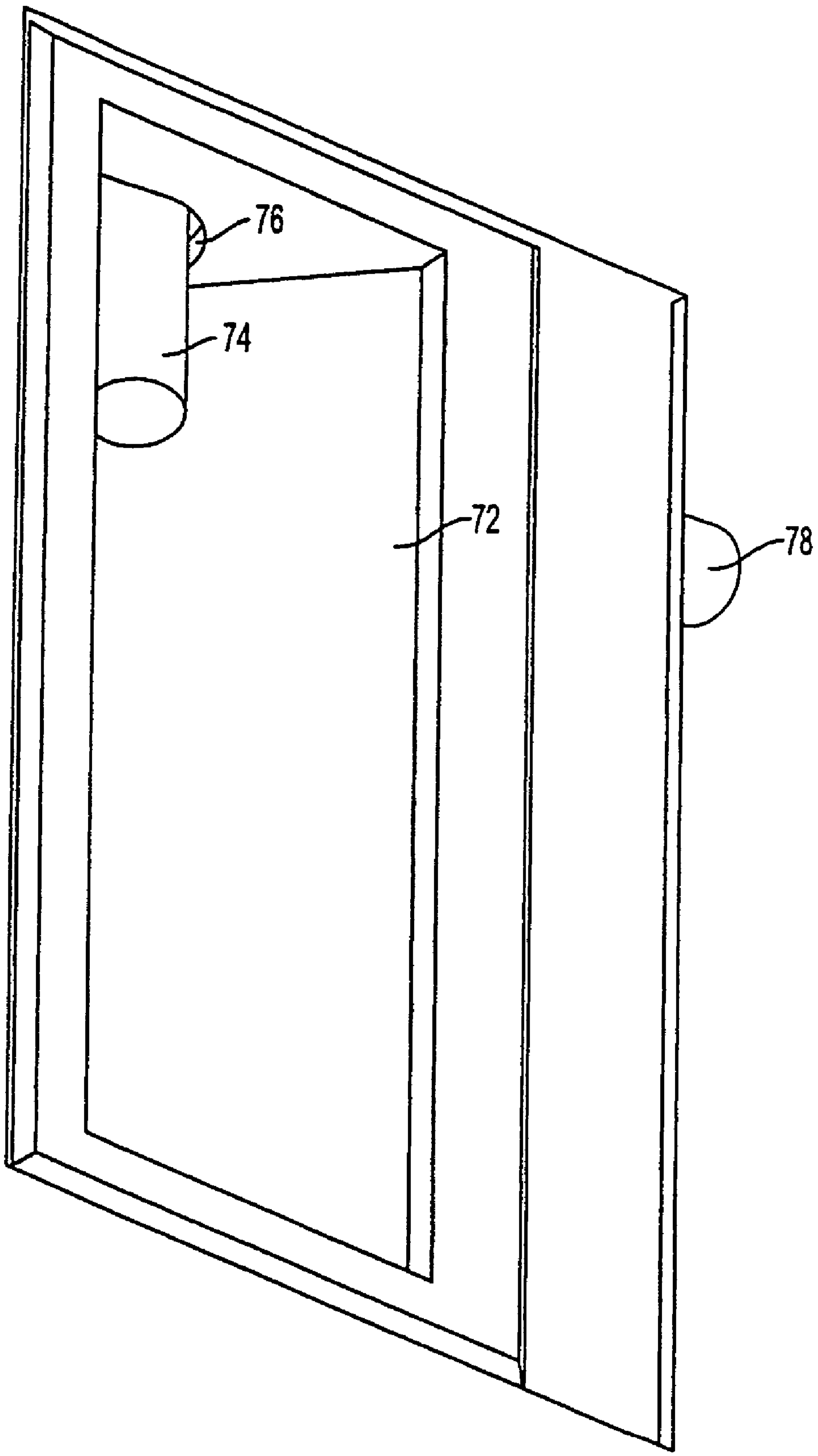
FIGS. 9(*a*) and 9(*b*) show a releasable latching mechanism for the FIG. 8 embodiment.
Figure 9B:
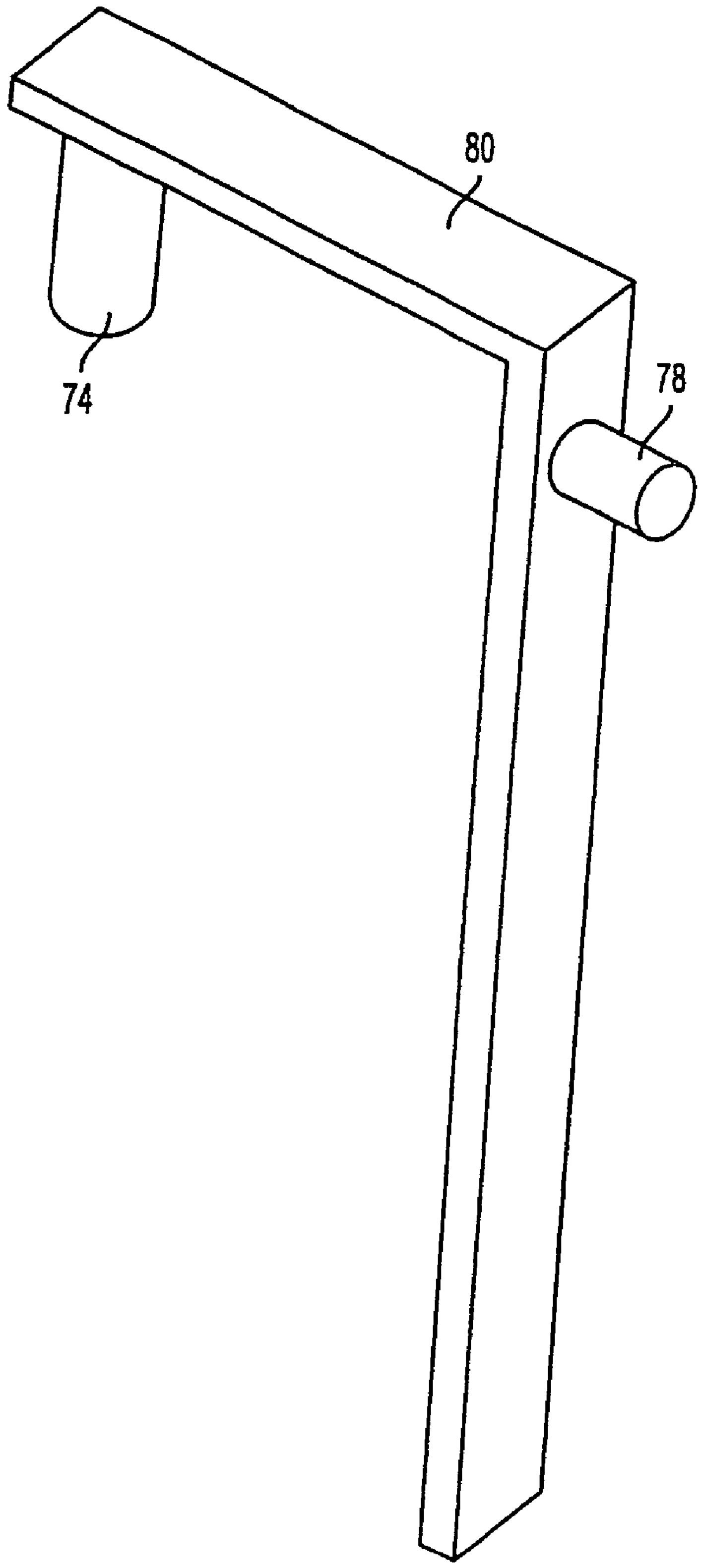

Turning to FIG. 9(*a*), recessed access slot 72 includes release button 74, which is movable in channel 76 and locking (latching) button 78. Leftward movement of release button 74 moves locking button 78 leftwardly and out of' engagement with a locking aperture (not shown) in substrate 68. As noted, the same activity occurs at the left margin of cover 70, and the cover may now be removed by downward sliding movement.

Turning to FIG. 9(*b*), buttons 74 and 78 are part of spring is clip 80, which is secured to the back panel. When button 78 is moved leftwardly to its release position; it remains in a preloaded state, waiting for the next locking requirement.

Referring again to the prior art showing of FIG. 1, the arrangement includes plural of connectors 20 and plural of signal processing units 24. Upon removal of all of the plural signal processing units, the possibility exists, upon reinsertion thereof, for insertion of a signal processing unit in a connector assigned to another signal processing unit. This problem is overcome by the arrangement of the invention shown in FIG. 10.

Figure 10:
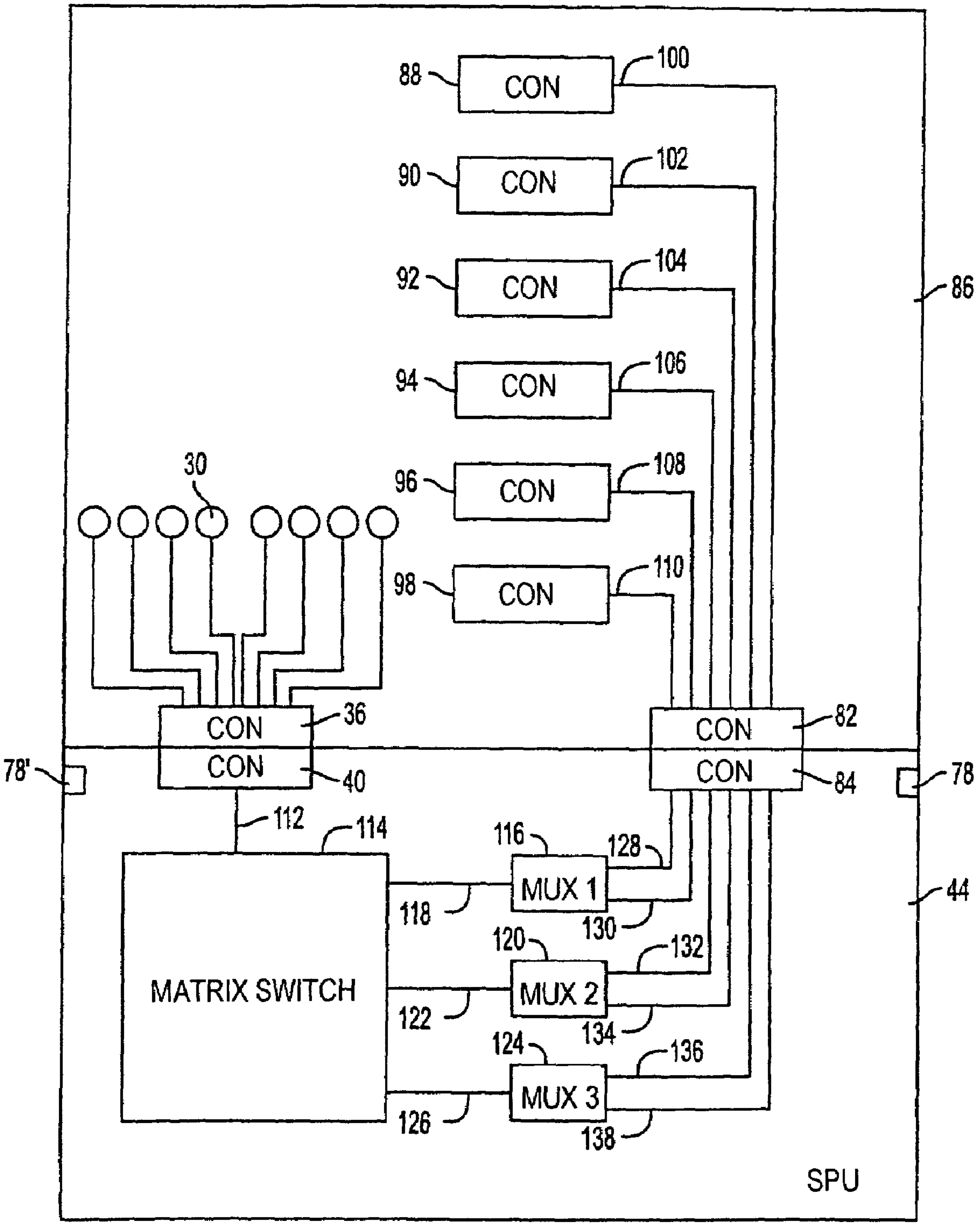
FIG. 10 is a schematic diagram of selected components of a CCTV system arranged in accordance with the invention.

Referring now to FIG. 10, the CCTV system depicted therein includes the aforementioned interconnectable connectors 36 and 40 and further interconnectable connectors 82 and 84. Back panel. 86 includes the six-by-eight row/column array 68 of FIG. 8 of s individual video signal connector contacts 30, one row being depicted as connected to connector 36 by conductors **36*a* through 36*h***.

Back panel 86 further includes connectors 88 through 98, connected individually to connector 82 by conductors 100 through 110.

Signal processing unit 44 includes conductors 112 for connecting matrix switch 114 to connector 40. Matrix switch 114 furnishes output signals to signal processing means, e.g., output signals to multiplexer 116 (MUX 1) over lines 118, output signals to multiplexer 120 (MUX 2) over lines 122, and output signals to multiplexer 124 (MUX 1) over lines 126.

Output signals of multiplexer 116 are conveyed over lines 128 and 130 to connector 84. Output signals of multiplexer 120 are conveyed over lines 132 and 134 to connector 84. Output signals of multiplexer 124 are conveyed over, lines 136 and 138 to connector 84.

Latching buttons 78 and 78' of FIG. 10 are provided at righthand and lefthand margins of the cover (not shown) of signal processing unit 44.

Connector 88 may be connectable to a connector of a monitor for multiplexer 116, and connector 90 may be connectable to a connector for a VCR for multiplexer 116. Connector 92 may be connectable to a connector of a monitor for multiplexer 120 and connector 94 may be connectable to a connector for a VCR for multiplexer 120. Connector 96 may be connectable to a connector of a monitor for multiplexer 124, and connector 98 may be connectable to a connector for a VCR for multiplexer 124.

In the FIG. 10 arrangement, the entirety of a CCTV system 10 signal processing unit (44) is removable and reattachable to a back panel collectively, unlike the arrangement of FIG. 2, for example. Accordingly, the reattachment error possibilities inherent in the FIG. 2 arrangement are avoided in the FIG. 10 arrangement.

Viewed otherwise, the arrangement of FIG. 10 provides is improvement of a CCTV system comprising N video cameras, a back panel having N connectors for receiving video output signals of the N video cameras, and M multiplexers connected to the back panel N connectors, M being a submultiple of N, wherein the M multiplexers are supported on a common substrate and mechanical latching means is provided for mutually securing the substrate and the back panel, the latching means being user operable for releasing the securement of the substrate and the back panel.

Various changes to the particularly depicted embodiment of the invention may be introduced without departing from the scope of the invention. Accordingly, it is to be appreciated that the particularly disclosed embodiments are intended in an illustrative, and not in a limiting, sense. The true spirit and scope of the invention is set forth in the ensuing claims.

What is claimed is:

1. A video signal connection apparatus comprising:

(a) an array of individual video signal connector contacts arranged in a matrix having connector rows and connector columns;

(b) a first connector having individual connector contacts corresponding in number to said individual video signal connector contacts of said array, said individual connector contacts being connected individually to said individual video signal connector contacts; and (c) a system expansion device having individual input contacts corresponding in number to said individual connector contacts and connected therewith, and first and second sets of output contacts, each output contact set having output contacts corresponding in number to said individual input contacts of said system expansion device, each output contact of each output contact set being connected to an individual one of said individual input contacts of said system expansion device.

2. The video signal connection apparatus claimed in claim 1, wherein said video signal connector contacts of said array extend in a first connection direction and wherein said individual input contacts of said system expansion device extend in a second connection direction orthogonal to said first connection direction.

3. The video signal connection apparatus claimed in claim 2, wherein said output contacts of said first output contact set of said system expansion device extend in a connection direction orthogonal to a connection direction of said output contacts of said second output contact set of said system expansion device.

4. The video signal connection apparatus claimed in claim 3, further including conductors interconnecting said individual connector contacts to said individual video signal connector contacts of said array, said conductors extending in said second connection direction.

5. The video signal connection apparatus claimed in claim 2, further including conductors interconnecting said individual connector contacts to said individual video signal connector contacts of said array, said conductors extending in said second connection direction.

6. The video signal connection apparatus claimed in claim 1, wherein said output contacts of said first output contact set of said system expansion device extend in a connection direction orthogonal to a connection direction of said output contacts of said second output contact set of said system expansion device.

7. The video signal connection apparatus claimed in claim 6, further including conductors interconnecting said individual connector contacts to said individual video signal connector contacts of said array.

8. The video signal connection apparatus claimed in claim 1, further including conductors interconnecting said individual connector contacts to said individual video signal connector contacts of said array.

9. The video signal connection apparatus claimed in claim 1, further including a second connector having an input contact set having contacts corresponding in number to said output contacts of said system expansion device first contact set and connected therewith.

10. The video signal connection apparatus claimed in claim 9, further including a signal processing unit connected to said input contacts of said second connector contact set.

11. The video signal connection apparatus claimed in claim 10, wherein said system expansion device is separable from said first connector and wherein said signal processing unit is separable from said system expansion device.

12. The video signal connection apparatus claimed in claim 9, wherein said contacts of said array extend in a first connection direction and said individual input contacts of said system expansion device extend in a second connection direction and said contacts of said second connector input contact set extend in said second connection direction.

* * * * *